US012307527B2

(12) United States Patent
Collao Benitez et al.

(10) Patent No.: US 12,307,527 B2
(45) Date of Patent: May 20, 2025

(54) SECURITY TRADING BACKTESTING SYSTEM HAVING AN INTERACTABLE JOURNAL

(71) Applicant: FX Replay, Inc., Oklahoma City, OK (US)

(72) Inventors: Rodrigo A. Collao Benitez, Norman, OK (US); Matthew Concordia, Innisfil (CA); John H. Goocher, Davidson, NC (US)

(73) Assignee: FX Replay, Inc, Oklahoma City, OK (US)

( * ) Notice: Subject to any disclaimer, the term of this patent is extended or adjusted under 35 U.S.C. 154(b) by 0 days.

(21) Appl. No.: 18/915,708

(22) Filed: Oct. 15, 2024

(65) Prior Publication Data

US 2025/0139700 A1    May 1, 2025

Related U.S. Application Data

(60) Provisional application No. 63/593,113, filed on Oct. 25, 2023.

(51) Int. Cl.
*G06Q 40/04* (2012.01)
(52) U.S. Cl.
CPC ................... *G06Q 40/04* (2013.01)
(58) Field of Classification Search
CPC .................................................. G06Q 40/04
See application file for complete search history.

(56) References Cited

U.S. PATENT DOCUMENTS 10,740,292 B2 *   8/2020   Haddad ............... G06F 16/9024
11,403,708 B2     8/2022   Yang
(Continued)

FOREIGN PATENT DOCUMENTS

| EP | 3166066 A1 * | 5/2017 | ............ G06Q 40/06 |
| WO | WO-2006048684 A2 * | 5/2006 | ............ G06Q 40/06 |
| WO | WO 2008/005034 | 1/2008 | |

OTHER PUBLICATIONS

Chen, Yuanda: Backtesting Performance with a Simple Trading Strategy using Market Orders, Dec. 2016, pp. 1-12 (Year: 2016).*
(Continued)

*Primary Examiner* — Bijendra K Shrestha
(74) *Attorney, Agent, or Firm* — DUNLAP CODDING, P.C.

(57) ABSTRACT

A system is disclosed herein. The system comprises a processor and a memory. The memory comprises a non-transitory medium storing processor-executable instructions that when executed by the processor, causes the processor to: generate a backtesting session view for a backtesting session comprising a historic stock mapped on a graph; receive a first input indicative of a user selecting a new trade option; generate a journal creation dialog having one or more inputs selected from: an add screenshot input, a checklist selector, a tag input, and a notes input; receive a journal model having one or more journal property based on the one or more input of the journal creation dialog; associate the journal model with the backtesting session; store the journal model in the memory; and update the backtesting session view to include one or more journal indicator corresponding to the journal model on the graph of the historic stock.

19 Claims, 11 Drawing Sheets

(56) References Cited

U.S. PATENT DOCUMENTS

2012/0271748 A1  10/2012  DiSalvo
2017/0308954 A1  10/2017  McLaren
2020/0402174 A1  12/2020  Hansen et al.
2023/0214921 A1* 7/2023   Feng ..................... G06Q 40/06
                                                    705/37

OTHER PUBLICATIONS

Pterson, Brian G.: Developing Backtesting Systematic Trading Strategies, Jun. 14, 2027, pp. 1-43 (Year: 2017).*
Columbia.edu: Understanding Journal Impact Indicators, Jun. 10, 2022, pp. 1-2 (Year: 2022).*
Lingrid: How to Effectvely Backtest Trading Strategy, Jul. 21, 2023, pp. 1-8 (Year: 2023).*
USPTO acting as the International Search Authority; International Search Report and Written Opinion regarding PCT/US2024/051265; mailed Dec. 11, 2024.

* cited by examiner

SECURITY TRADING BACKTESTING SYSTEM HAVING AN INTERACTABLE JOURNAL

CROSS-REFERENCE TO RELATED APPLICATIONS

This application claims priority to U.S. Provisional Patent Application No. 63/593,113, filed Oct. 25, 2023, the entire content of which is incorporated herein by reference in its entirety.

BACKGROUND

In the realm of financial markets, investors and analysts strive to develop strategies that maximize returns while minimizing risk. A common practice in the industry is the utilization of backtesting, a process where trading strategies are applied to historical data to gauge potential performance and viability.

However, these traditional backtesting methodologies have several inherent limitations. A user of traditional backtesting methodologies may apply varying trading strategies over the course of days, months, or even years. When looking at prior backtesting performance, the user is unable to adequately judge the varying trading strategies if the user is unable to recall the reasoning for a particular position. Further, the user is unable to receive feedback on trades in prior backtesting sessions.

Therefore, a need exists for an improved backtesting system that addresses these limitations.

SUMMARY

Traditional backtesting systems were unable to effectively associate user notes and insights with specific points in time during a backtesting trading session, making it difficult for users to review their decision-making process. The present invention solves this problem by providing an interactive journaling system integrated directly into the primary user interface.

The problem of a user being able to view past performance and recall reasoning for a security trading position is solved by the systems and methods herein disclosed. The systems and methods include a system comprising a processing component and a memory. The memory comprises a non-transitory processor-readable medium storing processor-executable instructions that when executed by the processing component, causes the processing component to: generate a backtesting session view for a backtesting session comprising a historic stock mapped on a graph; receive a first input indicative of a user selecting a new trade option; generate a journal creation dialog having one or more inputs selected from: an add screenshot input, a checklist selector, a tag input, and a notes input; receive a journal model having one or more journal property based on the one or more input of the journal creation dialog; associate the journal model with the backtesting session; store the journal model in the memory; and update the backtesting session view to include one or more journal indicator corresponding to the journal model on the graph of the historic stock.

The systems and methods further include a method comprising: generating, by a processing component, a backtesting session view for a backtesting session comprising a historic stock mapped on a graph, the graph having an axis of abscissas corresponding to a time and an axis of ordinates corresponding to a value of the historic stock; receiving a first input indicative of a user selecting a new trade option; generating a journal creation dialog having one or more inputs selected from: an add screenshot input, a checklist selector, a tag input, and a notes input; receiving a journal model having one or more journal property based on the one or more input of the journal creation dialog and a journal timestamp; associating the journal model with the backtesting session; storing the journal model in a memory; and drawing, in the backtesting session view, one or more journal indicator corresponding to the journal model on the graph of the historic stock, the one or more journal indicator having a position on the axis of abscissas corresponding to the journal timestamp.

Implementations of the above techniques include methods, apparatus, systems, and computer program products are described. One such computer program product is suitably embodied in a non-transitory computer-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
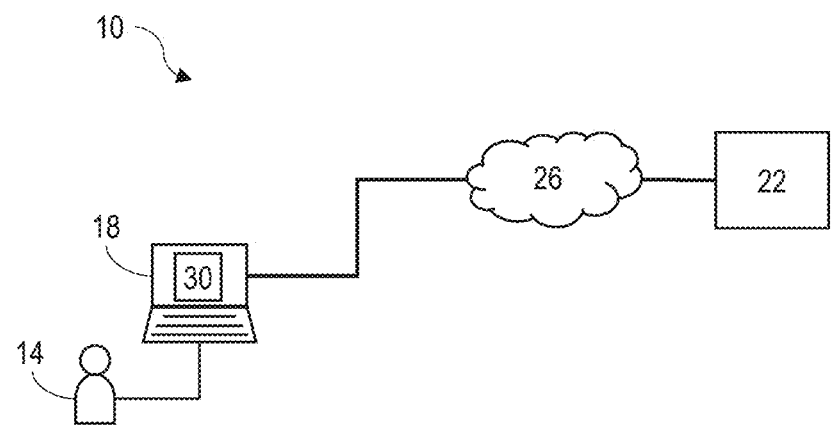
FIG. 1 is a diagram of an exemplary embodiment of hardware forming a system constructed in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted. The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure, or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value. It is not intended that the scope of the invention be limited to the specific values recited when defining a range. All ranges are inclusive and combinable.

Circuitry, as used herein, may be analog and/or digital components, or one or more suitably programmed processors (e.g., microprocessors) and associated hardware and software, or hardwired logic. Also, "components" may perform one or more functions. The term "processing component," may include hardware, such as a processor (e.g., microprocessor), an application specific integrated circuit (ASIC), a field programmable gate array (FPGA), a combination of hardware and software, software, and/or the like. The term "processor" as used herein means a single processor or multiple processors working independently or together to collectively perform a task.

Software may include one or more computer readable instruction that when executed by one or more component, e.g., a processor, causes the component to perform a specified function. It should be understood that the algorithms described herein may be stored on one or more non-transitory computer-readable medium. Exemplary non-transitory computer-readable media may include a non-volatile memory, a random-access memory (RAM), a read only memory (ROM), a CD-ROM, a hard drive, a solid-state drive, a flash drive, a memory card, a DVD-ROM, a Blu-ray Disk, a laser disk, a magnetic disk, an optical drive, combinations thereof, and/or the like. Such non-transitory computer-readable media may be electrically based, optically based, magnetically based, resistive based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

As used herein, the term 'backtesting' is a method used by investors and financial analysts to evaluate potential performance of a trading strategy or investment model using historical securities trading data. During backtesting, the trading strategy is applied to a past set of data (such as stock/security trading data) to ascertain how the trading strategy would have performed over a specified period of time. Backtesting involves simulating a historic stock as though it was presently being traded, such as in the stock market. The user is provided with an ability to make trades (positions and orders such as limit and stop orders) against the historic data and then analyzing backtesting results to identify potential trends, risks, and returns. Thus, backtesting helps in refining trading strategies and in identifying potential strengths and weaknesses of those trading strategies before implementing the trading strategies in real-time trading.

Referring now to the drawings, and in particular to FIG. 1, shown therein is a diagram of an exemplary embodiment of a system 10 constructed in accordance with the present disclosure. A user 14 may interact with the system 10 using a user device 18 that may be used to access a backtesting system 22. The user device 18 may communicate with the backtesting system 22 via a network 26. In one embodiment, the user 14 may have a user profile that allows the user 14 to access the backtesting system 22 while using the user device 18.

In some embodiments, the network 26 may be the Internet and/or other network. For example, if the network 26 is the Internet, a primary user interface 30 (described below in more detail) of the system 10 may be delivered through a series of web pages or private internal web pages of a company or corporation, which may be written in hypertext markup language (HTML/PHP/JavaScript), for example, and may be accessible by the user device 18. It should be noted that the primary user interface 30 of the system 10 may be another type of interface including, but not limited to, a Windows-based application, a tablet-based application, a mobile web interface, an application running on a mobile device, a virtual-reality interface, an augmented-reality interface, and/or the like.

The network 26 may be almost any type of network. For example, in some embodiments, the network 26 may be a version of an Internet network (e.g., exist in a TCP/IP-based network). In one embodiment, the network 26 is the Internet. It should be noted, however, that the network 26 may be almost any type of network and may be implemented as the World Wide Web (or Internet), a local area network (LAN), a wide area network (WAN), an LPWAN, a LoRaWAN, a metropolitan network, a wireless network, a WiFi network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, a short-wave wireless network, a long-wave wireless network, combinations thereof, and/or the like. It is conceivable that in the near future, embodiments of the present disclosure may use more advanced networking topologies.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of system 10 may perform one or more functions described as being performed by another one or more of the devices of the system 10. Devices of the system 10 may interconnect via wired connections, wireless connections, or a combination thereof.

Figure 2:
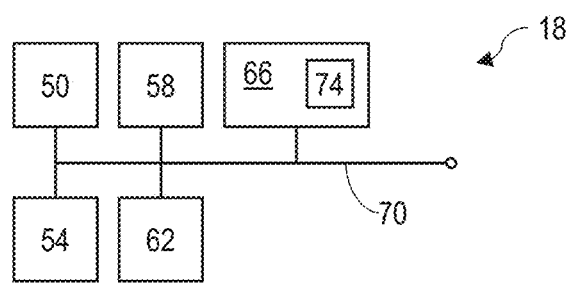
FIG. 2 is a diagram of an exemplary embodiment of a user device for use in the system of FIG. 1 constructed in accordance with the present disclosure.

Referring now to FIG. 2, shown therein is a diagram of an exemplary embodiment of the user device 18 of the system 10 constructed in accordance with the present disclosure. In some embodiments, the user device 18 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the user device 18 may include one or more input device 50 (hereinafter "input device 50"), one or more output device 54 (hereinafter "output device 54"), one or more processing component 58 (hereinafter "processing component 58"), one or more communication device 62 (hereinafter "communication device 62") capable of interfacing with the network 26, one or more memory 66 (hereinafter "memory 66") storing processor-executable code and/or application(s) 74 (hereinafter "user application 74"). The user application 74 may include, for example, a web browser capable of accessing a website and/or communicating information and/or data over a wireless or wired network (e.g., the network 26), and/or the like. The input device 50, output device 54, processing component 58, communication device 62, and memory 66 may be connected via a path 70 such as a data bus that permits communication among the components of user device 18.

The memory 66 may be one or more non-transitory processor-readable medium. The memory 66 may store the user application 74 that, when executed by the processing component 58, causes the user device 18 to perform an action such as communicate with or control one or more component of the user device 18 and/or, via the network 26, the backtesting system 22. The memory 66 may be one or more memory 66 working together, or independently, to store processor-executable code and may be located locally or remotely, e.g., accessible via the network 26.

The input device 50 may be capable of receiving information input from the user 14 and/or processing component 58, and transmitting such information to other components of the user device 18 and/or the network 26. The input device 50 may include, but is not limited to, implementation as a keyboard, a touchscreen, a mouse, a trackball, a microphone, a camera, a fingerprint reader, an infrared port, an optical port, a cell phone, a smart phone, a PDA, a remote control, a fax machine, a wearable communication device, a network interface, combinations thereof, and/or the like, for example.

The output device 54 may be capable of outputting information in a form perceivable by the user 14 and/or processing component 58. Implementations of the output device 54 may include, but are not limited to, a computer monitor, a screen, a touchscreen, a speaker, a website, a television set, a smart phone, a PDA, a cell phone, a fax machine, a printer, a laptop computer, a haptic feedback generator, an olfactory generator, combinations thereof, and the like, for example. It is to be understood that in some exemplary embodiments, the input device 50 and the output device 54 may be implemented as a single device, such as, for example, a touchscreen of a computer, a tablet, or a smartphone. It is to be further understood that as used herein the term user (e.g., the user 14) is not limited to a human being, and may comprise a computer, a server, a website, a processor, a network interface, a user terminal, a virtual computer, combinations thereof, and/or the like, for example. The output device 54 may display the primary user interface 30 on the user device 18.

The network 26 may permit bi-directional communication of information and/or data between the user device 18 and/or the backtesting system 22. The network 26 may interface with the backtesting system 22 and/or the user device 18 in a variety of ways. For example, in some embodiments, the network 26 may interface by optical and/or electronic interfaces, and/or may use a plurality of network topographies and/or protocols including, but not limited to, Ethernet, TCP/IP, circuit switched path, combinations thereof, and/or the like, as described above.

Exemplary embodiments of the processing component 58 may include, but are not limited to, a digital signal processor (DSP), a central processing unit (CPU), a field programmable gate array (FPGA), a microprocessor, a multi-core processor, an application specific integrated circuit (ASIC), combinations thereof, and/or the like, for example. The processing component 58 may be capable of communicating with the memory 66 via the path 70 (e.g., data bus). The processing component 58 may be capable of communicating with the input device 50 and/or the output device 54. The processing component 58 may include one or more processing component 58 working together, or independently, and located locally, or remotely, e.g., accessible via the network 26.

Figure 3:
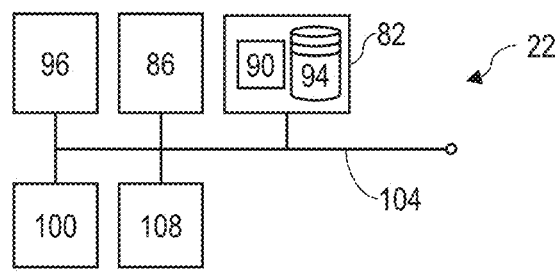
FIG. 3 is a diagram of an exemplary embodiment of a backtesting system of the system of FIG. 1 constructed in accordance with the present disclosure.

Referring now to FIG. 3, shown therein is a diagram of an exemplary embodiment of the backtesting system 22 constructed in accordance with the present disclosure. The backtesting system 22 may include one or more device that execute(s) one or more application or service in a manner described herein. In the illustrated embodiment, the backtesting system 22 is provided with a memory 82 (hereinafter "memory 82") accessible by one or more processing component 86 (hereinafter "processing component 86"). The memory 82 may include one or more non-transitory computer-readable medium storing processor-executable code and/or software application(s) 90 (hereinafter "backtesting application 90") and one or more database 94 (hereinafter "database 94").

In one embodiment, the database 94 can be a relational database, a time-series database, a vector database, a non-relational database, or the like. Examples of such databases comprise, DB2®, Microsoft® Access, Microsoft® SQL Server, Oracle®, MySQL, PostgreSQL, MongoDB, Apache Cassandra, Weaviate, and the like. It should be understood that these examples have been provided for the purposes of illustration only and should not be construed as limiting the presently disclosed inventive concepts. The database 94 can be centralized or distributed across multiple systems.

In some embodiments, the backtesting system 22 may comprise the one or more processing component 86 working together, or independently to, execute processor-executable code, such as the backtesting application 90, stored on the memory 82. Additionally, the backtesting system 22 may include at least one input device 96 (hereinafter "input device 96") and at least one output device 100 (hereinafter "output device 100"). Each element of the backtesting system 22 may be partially or completely network-based or cloud-based, and may or may not be located in a single physical location.

The processing component 86 may be implemented as a single processing component or multiple processing components working together, or independently, to execute the backtesting application 90 as described herein. It is to be understood, that in certain embodiments using more than one processing component 86, the processing components 86 may be located remotely from one another, located in the same location, or comprising a unitary multi-core processor. The processing components 86 may be capable of reading and/or executing processor-executable code and/or capable of creating, manipulating, retrieving, altering, and/or storing data structures into the memory 82 such as in the database 94.

Exemplary embodiments of the processing component 86 may be constructed similar to and in accordance with the processing component 58 described above in more detail. The processing component 86 may be capable of communicating with the memory 82 via a path 104 (e.g., data bus). The processing component 86 may be capable of communicating with the input device 96 and/or the output device 100.

The processing component 86 may be further capable of interfacing and/or communicating with the user device 18 via the network 26 using a communication device 108. For example, the processing component 86 may be capable of communicating via the network 26 by exchanging signals (e.g., analog, digital, optical, and/or the like) via one or more port (e.g., physical or virtual ports) using a network protocol to provide updated information to the user application 74 or the primary user interface 30 executed on the user device 18.

In some embodiments, the memory 82 may be located in the same physical location as the backtesting system 22, and/or one or more memory 82 may be located remotely from the backtesting system 22. For example, the memory 82 may be located remotely from the backtesting system 22 and communicate with the processing component 86 via the network 26. Additionally, when more than one memory 82 is used, a first memory 82 may be located in the same physical location as the processing component 86, and additional memory 82 may be located in a location physically remote from the processing component 86. Additionally, the memory 82 may be implemented as a "cloud" non-transitory processor-readable medium (i.e., one or more memory 82 may be partially or completely based on or accessed using the network 26).

The memory 82 may store processor-executable code and/or information comprising the database 94 and the backtesting application 90. In some embodiments, the backtesting application 90 may be stored as a compiled application file, such as an executable file, for example, or in a structure (or unstructured) format, such as, e.g., in a non-compiled file.

The input device 96 of the backtesting system 22 may transmit data to the processing component 86 and may be constructed in accordance with or similar to the input device 50 of the user device 18 described above in more detail. The input device 96 may be located in the same physical location as the processing component 86, or located remotely and/or partially or completely network-based. The output device 100 of the backtesting system 22 may transmit information from the processing component 86 to the user 14, and may be similar to the output device 54 of the user device 18. The output device 100 may be located with the processing component 86, or located remotely and/or partially or completely network-based.

Figure 4:
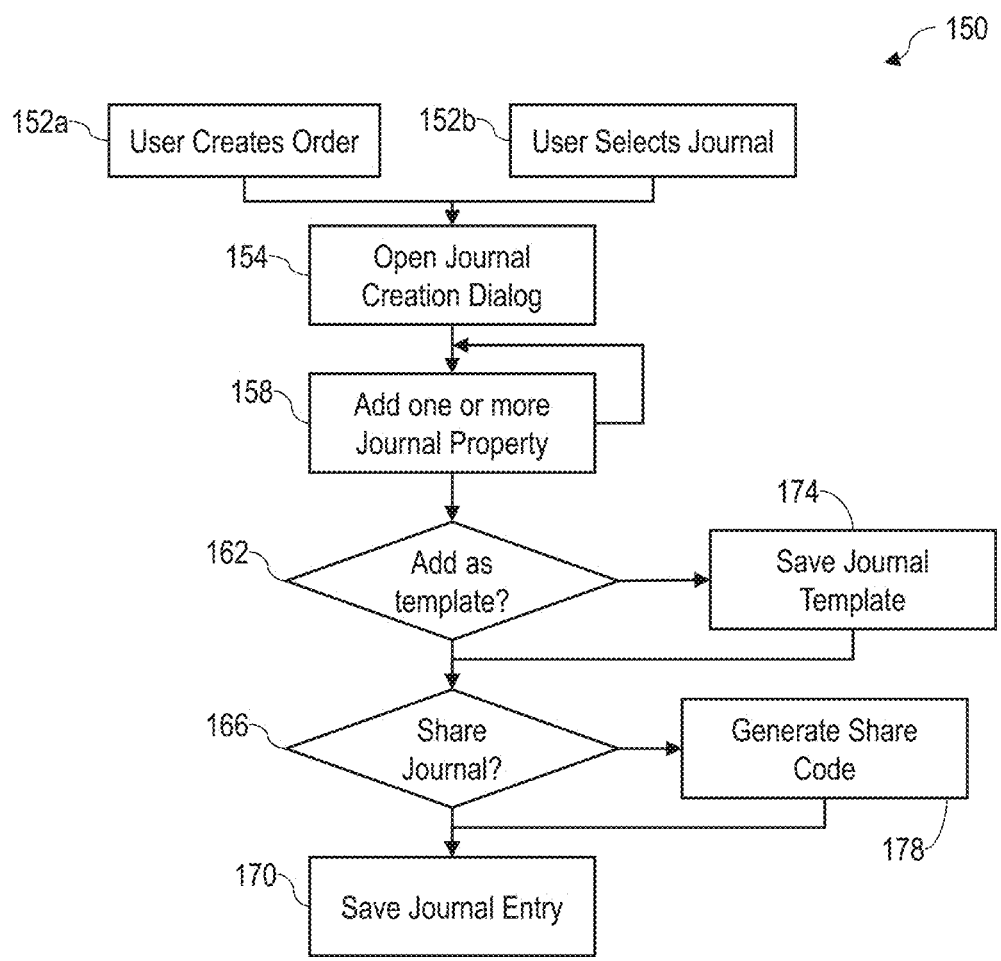
FIG. 4 is a process flow diagram of an exemplary embodiment of a process in accordance with the present disclosure.

Referring now to FIG. 4, shown therein is a process flow diagram of an exemplary embodiment of a journaling process 150 constructed in accordance with the present disclosure. The journaling process 150 generally comprises the steps of: generating a journal creation dialog (step 154); receiving one or more journal property as part of a journal model (step 158); determining whether to add the journal model as a template (decision 162); determining whether to share the journal entry (decision 166); and storing the journal entry (step 170). In one embodiment, the journaling process 150 may be programmed (e.g., as the backtesting application 90) as a series of steps to be performed by the processing component 86 to generate a journal entry having one or more journal property.

Figure 5A:
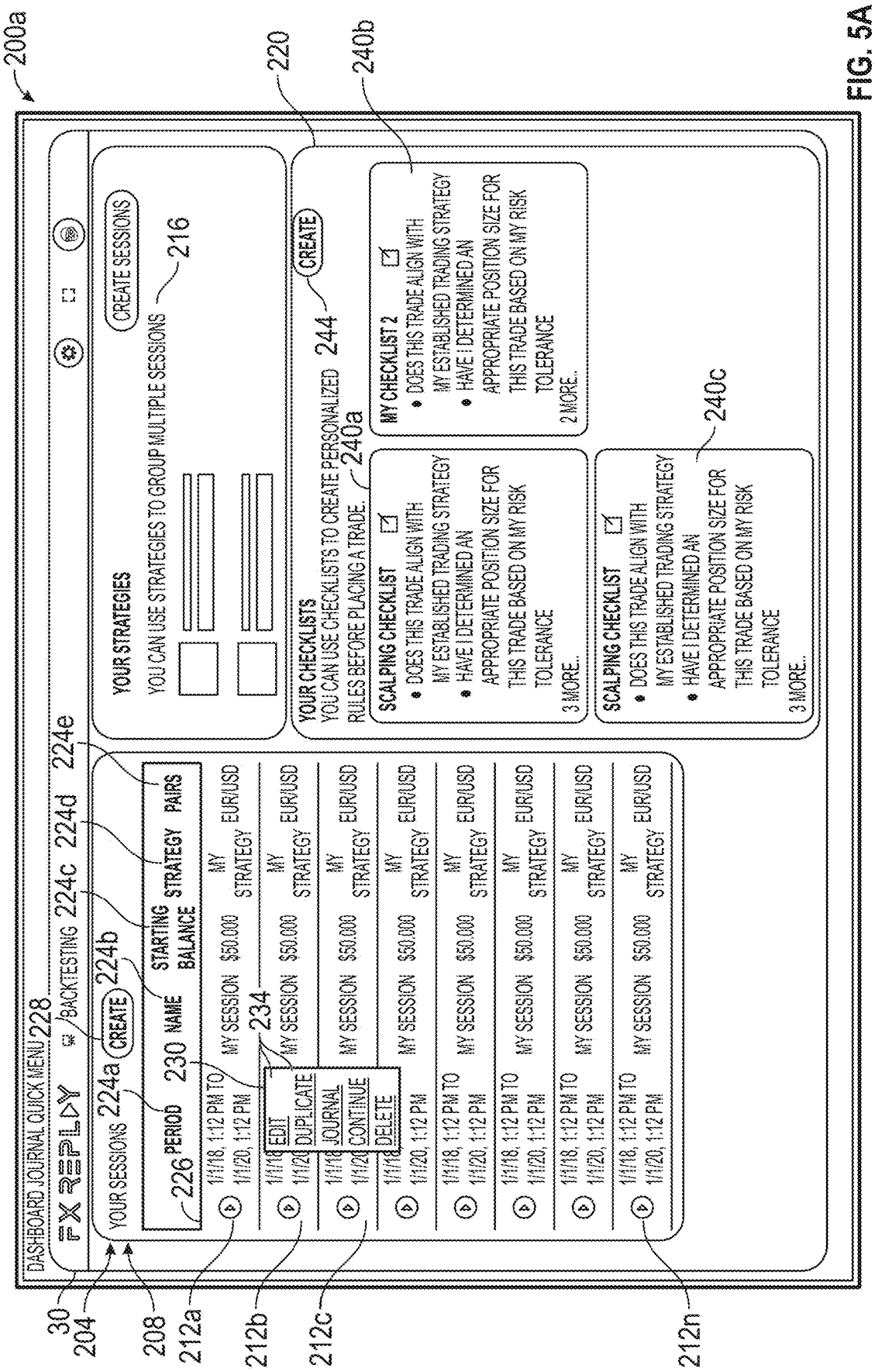
FIG. 5A is a screenshot of an exemplary embodiment of the user device displaying the primary user interface with a journal dashboard constructed in accordance with the present disclosure.
Figure 5B:
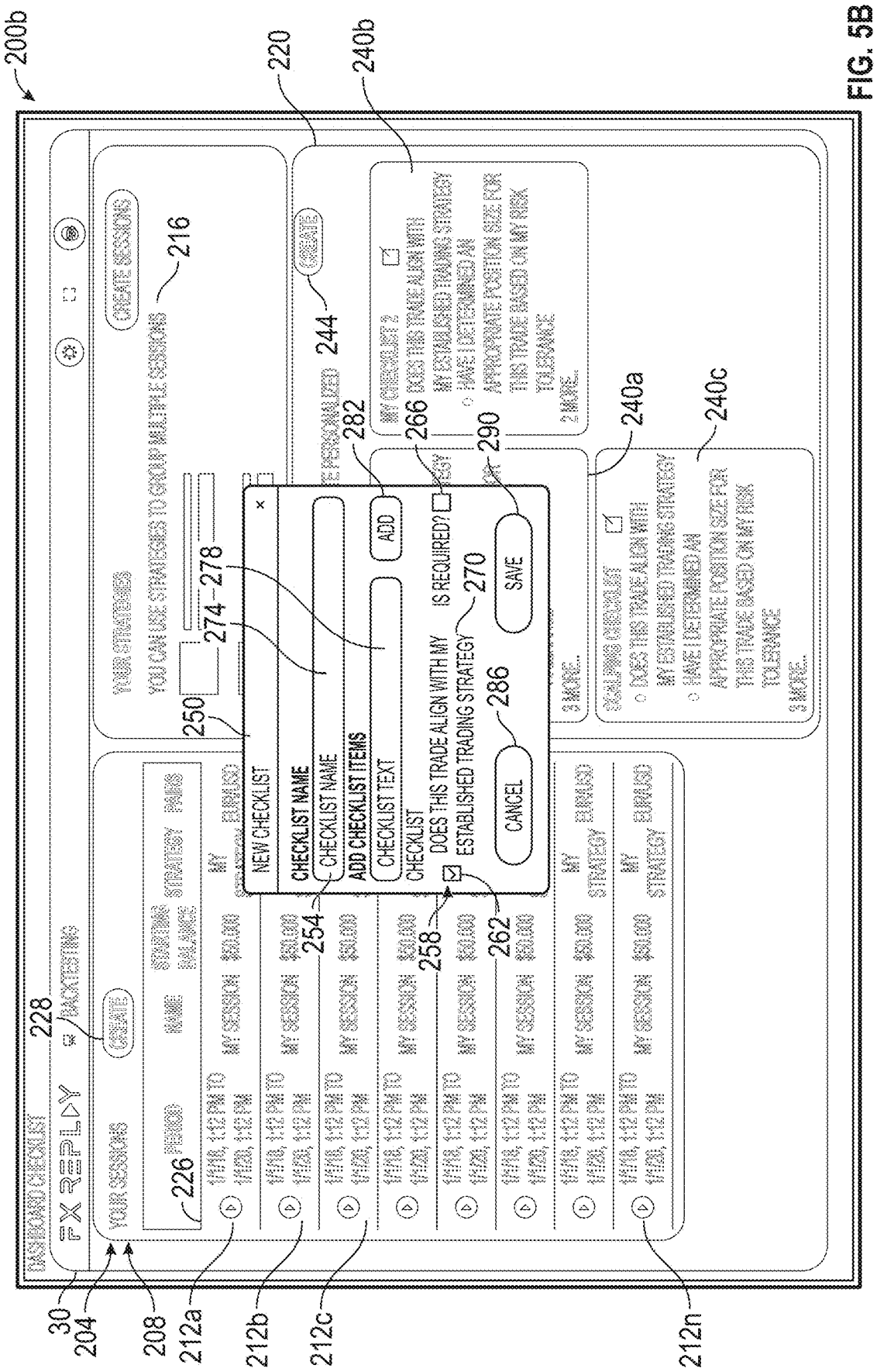
FIG. 5B is a screenshot of an exemplary embodiment of the user device displaying the primary user interface with a checklist dialog displayed in accordance with the present disclosure.
Figure 5C:
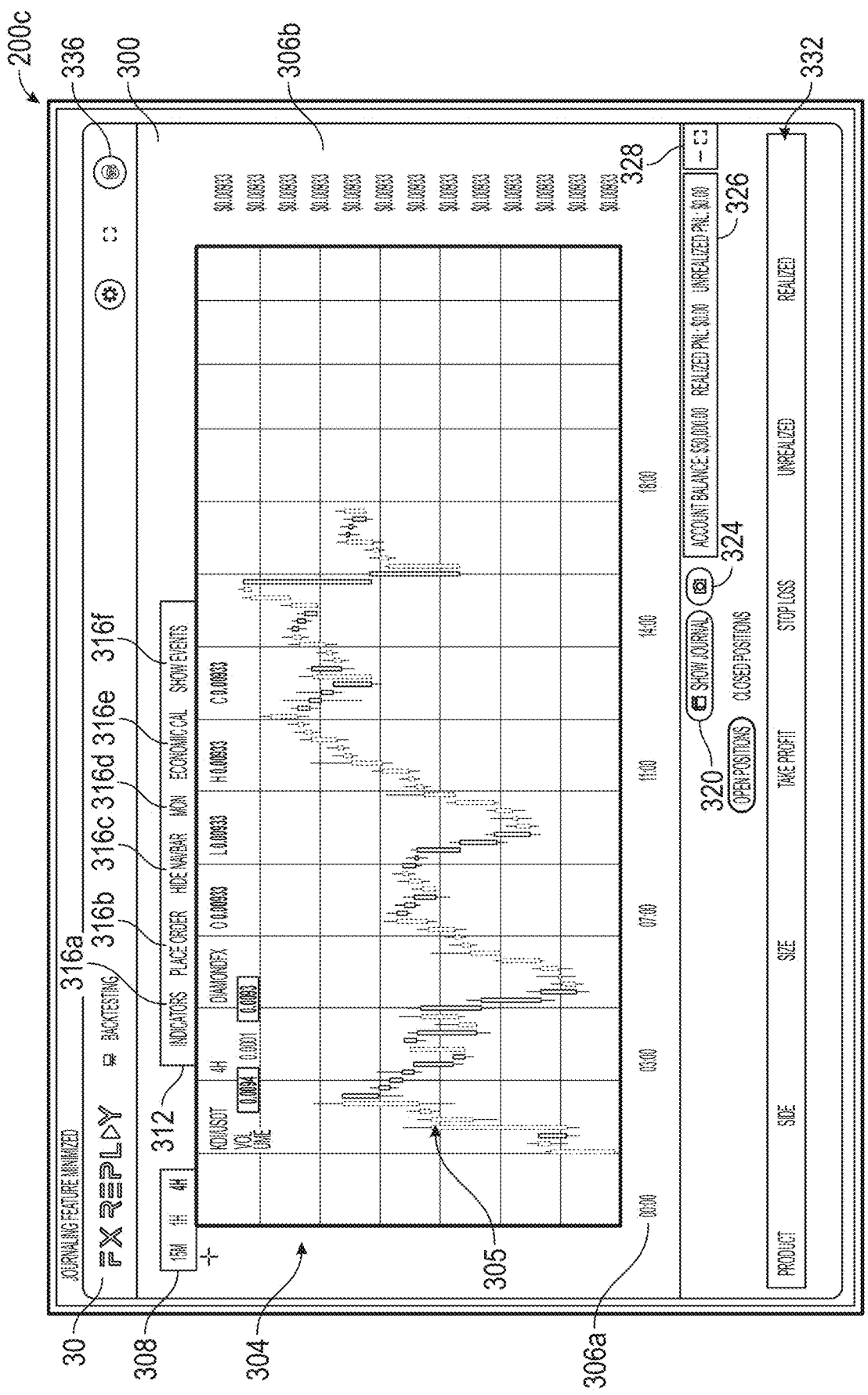
FIG. 5C is a screenshot of an exemplary embodiment of the user device displaying the primary user interface with a backtesting session view displayed in accordance with the present disclosure.
Figure 5D:
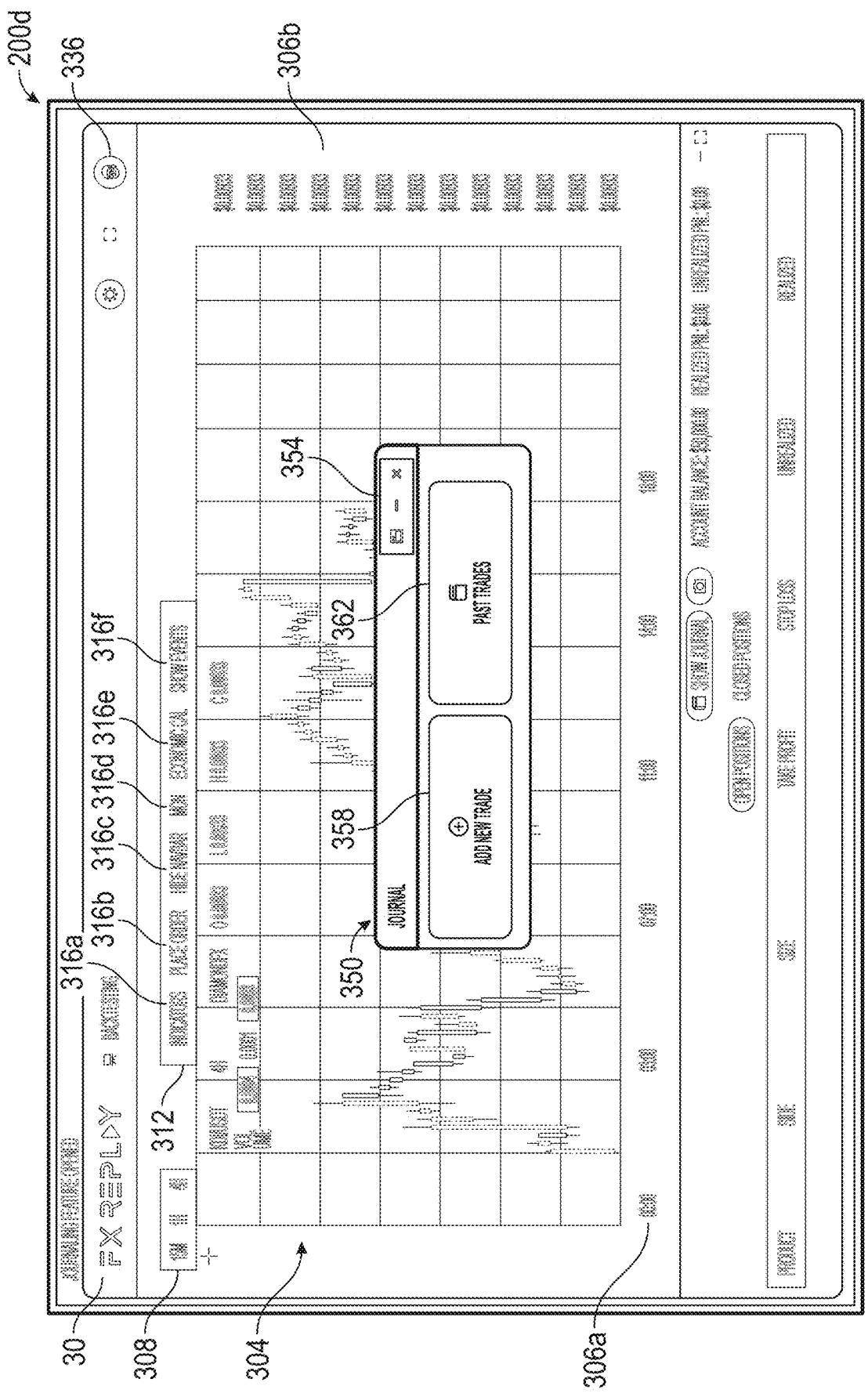
FIG. 5D is a screenshot of an exemplary embodiment of the user device displaying the primary user interface with a journal command dialog displayed in accordance with the present disclosure.

In one embodiment, generating a journal creation dialog (step 154) may be triggered upon selection of a new trade option (step 152*a*) in a journal command dialog (shown in FIG. 5D). Upon selection of the new trade option, the processing component 86 executing the backtesting application 90 stored in the memory 82 may cause the output device 54 of the user device 18 to generate the journal creation dialog (step 154).

In one embodiment, generating a journal creation dialog (step 154) may be triggered upon selection of a view trade option (step 152*b*) in the journal command dialog (shown in FIG. 5D). Upon selection of the view trade option, the processing component 86 executing the backtesting application 90 stored in the memory 82 may cause the output device 54 of the user device 18 to generate a view journal dialog (discussed in detail below and shown in FIG. 5G) (step 154).

In one embodiment, generating a journal creation dialog (step 154) comprises opening a journal creation dialog (shown in FIG. 5E and discussed below) of the backtesting application 90. The journal creation dialog may be displayed on the output device 54 of the user device 18. For example, the journal creation dialog may be displayed as the primary user interface 30.

In one embodiment, receiving one or more journal property as part of a journal model (step 158) includes receiving one or more input from the processing component 58 of the user device 18 indicative of selection of one or more journal property to include in the journal entry. Upon indication of selection of one or more journal property, the processing component 86 may include the selected journal property as part of a journal modal. The one or more journal property may be one or more of: a screenshot, an order or position; a checklist; a tag; a note; a timestamp; trade details; and the like, or a combination thereof.

In one embodiment, receiving one or more journal property as part of a journal model (step 158) may further include receiving one or more value input from the processing component 58 of the user device 18 indicative of one or more journal value for the journal entry. That is, the processing component 86 may receive a first value input indicative of a first journal value for a first journal property and a second value input indicative of a second journal value for a second journal property. The processing component 86 may then store the first journal value and the second journal value in the journal model as a journal entry, e.g., in the memory 82. For example, the processing component 86 may receive a first value input indicative of a screenshot for a screenshot journal property and store the screenshot as the screenshot journal property in the journal entry having the journal model. The processing component 86 may also receive a second value input indicative of an order or position for an order or position journal property and store the order or position as the order or position journal property in the journal entry having the journal model.

In one embodiment, determining whether to add the journal model as a template (decision 162) includes receiving a template input from the processing component 58 of the user device 18 indicative of whether to include the journal model as a template. For example, the processing component 86 may receive the template input from the processing component 58, and, the template input being indicative of creating a journal template, may store the journal model (step 174) as a journal template in the memory 82, such as in the database 94. In one embodiment, decision 162 is optional. For example, if the processing component 86 does not present the user with an option to store the journal model as a journal template via the primary user interface 30 of the user device 18, decision 162 may be omitted.

In one embodiment, determining whether to share the journal entry (decision 166) includes receiving a sharing input from the processing component 58 of the user device 18 indicative of whether to share the journal entry (or the journal model) with another user. For example, the processing component 86 may receive the sharing input from the processing component 58, and, the sharing input being indicative of sharing the journal entry (or journal model), may generate a sharable code (step 178) operable to, when utilized by another user operating a second user device (e.g., a second user device in accordance with the user device 18), the other user may access the journal entry (or journal model), which may otherwise be private (i.e., in accessible by other users). The processing component 86 may store the sharable code in the memory 82*m* such as in the database 94 and associate the shareable code with the journal entry (or journal model). In one embodiment the shareable code may be a unique code and/or a URL. In another embodiment, the shareable code may be a link to add the other user to an access control list (ACL) of the journal entry (or journal model). In one embodiment, decision 166 is optional. For example, if the processing component 86 does not present the user with an option to share the journal entry (or journal model) via the primary user interface 30 of the user device 18, decision 166 may be omitted.

In one embodiment, saving the journal entry (step 170) may include the processing component 86, executing the backtesting application 90, storing the journal entry in the memory 82, such as in the database 94. Storing the journal entry in the memory 82 may include storing the journal entry having the journal model (e.g., having data structured in accordance with the journal model) stored in the memory 82. Saving the journal entry (step 170) includes the processing component 86, executing the backtesting application 90, storing the one or more journal properties in the memory 82 as part of, or associated with, the journal entry.

Referring now to FIG. 5A, shown therein is a screenshot 200*a* of an exemplary embodiment of the user device 18 displaying the primary user interface 30 with a journal dashboard 204 constructed in accordance with the present disclosure. As shown by the screenshot 200*a*, the processing component 58 may display the primary user interface 30 of the backtesting application 90 on the user device 18 to display a backtesting session list 208 having one or more backtesting item 212*a-n* associated with a particular backtesting session, a strategy group 216, and a checklist group 220.

In one embodiment, the journal dashboard 204 may be generated by the processing component 86 and may be transmitted by the processing component 86 to the processing component 58 via the network 26. For example, the journal dashboard 204 may be a series of web pages or a web application that is generates by the processing component 86 and displayed on the primary user interface 30 on the output device 54 of the user device 18 by the processing component 58.

The backtesting session list 208 may display a list of one or more of the backtesting items 212, for which each backtesting item 212 may be associated with a particular backtesting session. The backtesting session list 208 may display the list of all backtesting items 212 for the user, or, in other embodiments, may display a list of a subset of the backtesting items 212 for the user.

As shown in FIG. 5A, each backtesting item 212 includes one or more backtesting property label 224, for example, shown as a period label 224a, a name label 224b, a starting balance label 224c, a strategy label 224d, and a pairs label 224e. In other embodiments, additional backtesting property labels 224 may be provided. Each backtesting property label 224 may correspond to a backtesting property of the backtesting session. The period label 224a may be a timeperiod or a timeframe that a particular backtesting session includes or is executed over. The name label 224b may be a name of the particular backtesting session. The starting balance label 224c may be a starting balance of the particular backtesting session. The strategy label 224d may correspond to a strategy name of a particular strategy in the strategy group 216. The pairs label 224e may refer to any financial instrument or asset available within the particular backtesting session. For example, the pair of instruments may encompass two or more assets, such as one or more financial instruments. The one or more financial instruments may include, for example, stocks, bonds, currency (e.g., US Dollar, Euro, and the like), commodities (e.g., gold and silver), and/or any other tradable asset. While each backtesting item 212 is shown with a currency pair associated with the pairs label 224e (e.g., shown with EUR/USD), the pairs are not limited to currency pairs alone and may encompass a wide range of assets or financial instruments that the user desires to analyze.

In one embodiment, each of the one or more backtesting property labels 224 for the associated backtesting session may be stored in the memory 82, such as in the database 94, and may be associated with the particular backtesting session.

In one embodiment, each backtesting item 212 includes a view input 226. The processing component 86 may receive one or more input from the user device 18 indicative of selection of the view input 226 of a particular backtesting item 212 by the user, and, responsive to the selection, may cause the primary user interface 30 to replay the associated backtesting session of the particular backtesting item 212.

In one embodiment, the processing component 86 may receive one or more input from the user device 18 indicative of the user selecting a create input 228. Responsive to the selection of the create input 228, the processing component 86 may generate a new backtesting session.

In one embodiment, the processing component 86 may generate a backtesting item context menu 230 responsive to receiving an input from the user via the user device 18. For example, if the user right-clicks (or hold-clicks) a particular backtesting item 212, the processing component 86 may generate the backtesting item context menu 230 having one or more context menu operations 234 operable to, upon selection by the user via the user device 18, cause the processing component 86 to execute a particular function against the backtesting session associated with the particular backtesting item 212. In one embodiment, the one or more context menu operations 234 include operations that when executed by the processing component 86 may cause the processing component 86 to: edit the backtesting session; duplicate the backtesting session; view the journal of the backtesting session; continue the backtesting session; and delete the backtesting session.

In one embodiment, the journal dashboard 204 may further include the strategy group 216. The strategy group 216 may include one or more session collection having a strategy name and associated with one or more backtesting session. In one embodiment, the one or more backtesting session is mutually exclusive between session collections, that is, each backtesting session can only be associated with one session collection. In other embodiments, each backtesting session can be associated with more than one session collection. As shown, each backtesting item 212 may display the strategy label 224d comprising the strategy name of the session collection of which the backtesting session associated with the backtesting item 212 is a member.

In one embodiment, the journal dashboard 204 may further include the checklist group 220. The checklist group 220 may display one or more checklist 240a-n (shown as a first checklist 240a, a second checklist 240b, and a third checklist 240c). Each checklist 240 may be created and customized by the user. In one embodiment, the checklist 240 may be used as a reminder of one or more step that the user has identified as important to follow before the user places an order. Upon selection of a particular checklist 240, the processing component 86 may prompt the user to update or edit the particular checklist 240. In one embodiment, the checklist group 220 may further comprise a new checklist input 244. The processing component 86, responsive to the user selecting the new checklist input 244 may generate a checklist dialog 250.

Referring now to FIG. 5B, shown therein is a screenshot 200b of an exemplary embodiment of the user device 18 displaying the primary user interface 30 with the checklist dialog 250 displayed in accordance with the present disclosure. In one embodiment, the checklist dialog 250 is displayed over the journal dashboard 204, however, in other embodiments, the checklist dialog 250 may be displayed in the primary user interface 30 on its own screen.

In one embodiment, each checklist 240 comprises a checklist name 254 and one or more checklist item 258. Each checklist item 258 may comprise a checkbox toggle 262, a requirement indicator 266, and an item text 270. In one embodiment, the user, interacting with the user device 18 may input the checklist name 254 into a name input field 274. Further, the user, interacting with the user device 18, may add the one or more checklist item 258 by inputting the item text 270 in an item text input field 278 and selecting an add button input 282. When the add button input 282 is selected by the user, the processing component 58 may select a first value of the item text input field 278 and associate the first value with a second value of the name input field 274 as a new checklist object.

In one embodiment, the user, interacting with the user device 18, may toggle the requirement indicator 266. The processing component 58 may identify that the requirement indicator 266 has changed and update the checklist item 258 of the new checklist object based on the requirement indicator 266. While the requirement indicator 266 is shown as a toggle that, when selected, indicates that the checklist item 258 having the item text 270 is required, in other embodiments, the requirement indicator 266 may be a toggle that, when selected, indicates that the checklist item 258 having the item text 270 is not required.

In one embodiment, the user, interacting with the primary user interface 30 via the user device 18, may select a cancel button input 286. When the cancel button input 286 is selected by the user, the processing component 58 may discard the new checklist object (e.g., delete the new checklist object) and close the checklist dialog 250.

In one embodiment, the user, interacting with the primary user interface 30 via the user device 18, may select a save button input 290. When the save button input 290 is selected by the user, the processing component 58 may validate one or more of: the checklist name 254 and the one or more checklist items 258, e.g., the processing component 58 may determine whether characters input into the name input field 274 are characters that have been allowed as the checklist name 254. The processing component 58 may then transmit the new checklist object from the user device 18 to the backtesting system 22, e.g., via the network 26. The processing component 86 of the backtesting system 22 may receive the new checklist object from the user device 18 via the communication device 62. The processing component 86 may then store the new checklist object into the memory 82, such as in the database 94 and associate the new checklist object with the user. In one embodiment, the new checklist object transmitted by the processing component 58 to the processing component 86 may only include checklist items 258 for which the checkbox toggle 262 is selected. In one embodiment, upon saving the new checklist object in the memory 82, the processing component 86 may transmit a response to the processing component 58 indicative of successfully storing the new checklist object. The processing component 58 may receive the response and close the checklist dialog 250. In one embodiment, the processing component 58 may display the response to the user via the primary user interface 30.

In one embodiment, the checklist dialog 250 may further include a share button input (not shown). When the share button input is selected by the user, the processing component 58 may transmit a share checklist signal to the processing component 86. The processing component 86 may generate a shareable code, associate the sharable code with the checklist, and transmit the sharable code to the processing component 58 and cause the processing component 58 to provide the sharable code with the user. In one embodiment, the sharable code may be a URL which links to the checklist. In another embodiment, access to the checklist may be controlled by an ACL, in which case, upon receiving the share checklist signal, the processing component 86 may update the ACL to provide access to the checklist to one or more user or user group.

Referring now to FIG. 5C, shown therein is a screenshot 200c of an exemplary embodiment of the user device 18 displaying the primary user interface 30 with a backtesting session view 300 displayed in accordance with the present disclosure. Generally, the backtesting session view 300 displays a backtesting session, such as the backtesting session associated with a particular backtesting item 212 selected by the user 14 from the journal dashboard 204.

As shown, the backtesting session view 300 includes a graph 304, such as a candlestick line graph, showing a value of a historic stock 305 and having an axis of abscissas 306a showing a time, and an axis of ordinates 306b showing a stock value. The backtesting session view 300 provides the user with a timeframe 308 for which the graph of the historic stock pertains, as well as an option menu 312 having one or more option 316a-n. For example, the option menu 312 may include an indicator option 316a, a place order option 316b, a hide navbar option 316c, a Mon option 316d, an economic cal option 316e, and a show events option 316f. In one embodiment, the indicator option 316a, when selected by the user, causes the processing component 58 to display one or more indicators on the graph 304. In one embodiment, the place order option 316b, when selected by the user, causes the processing component 58 to display a place order dialog on the primary user interface 30. In one embodiment, the hide navbar option 316c, when selected by the user, causes the processing component 58 to hide the option menu 312 from the display on the graph 304. In one embodiment, the Mon option 316d, when selected by the user, causes the processing component 58 to toggle a "day of week" modal, e.g., when a cursor is within the graph 304 or over the historic stock 305. In one embodiment, the economic cal option 316e, when selected by the user, causes the processing component 58 to display an economic calendar drawer operable to display an economic calendar for one or more country. In one embodiment, the show events option 316f, when selected by the user, causes the processing component 58 to display one or more event of the economic calendar on the graph 304.

In one embodiment, the processing component 86 may retrieve the value of the historic stock 305 from the memory 82, such as from the database 94. In one embodiment, the database 94 storing the historic stock values is a non-relational database and/or a time-series database.

In one embodiment, the backtesting session view 300 includes a show journal input 320 operable to cause the processing component 58 to display a journal command dialog 350 (shown in FIG. 5D and discussed below). The backtesting session view 300 may further include a screenshot input 324 operable to cause the processing component 58 to capture a journal screenshot (shown in FIG. 5E and discussed in more detail below) of the graph 304 when selected by the user.

Figure 5E:
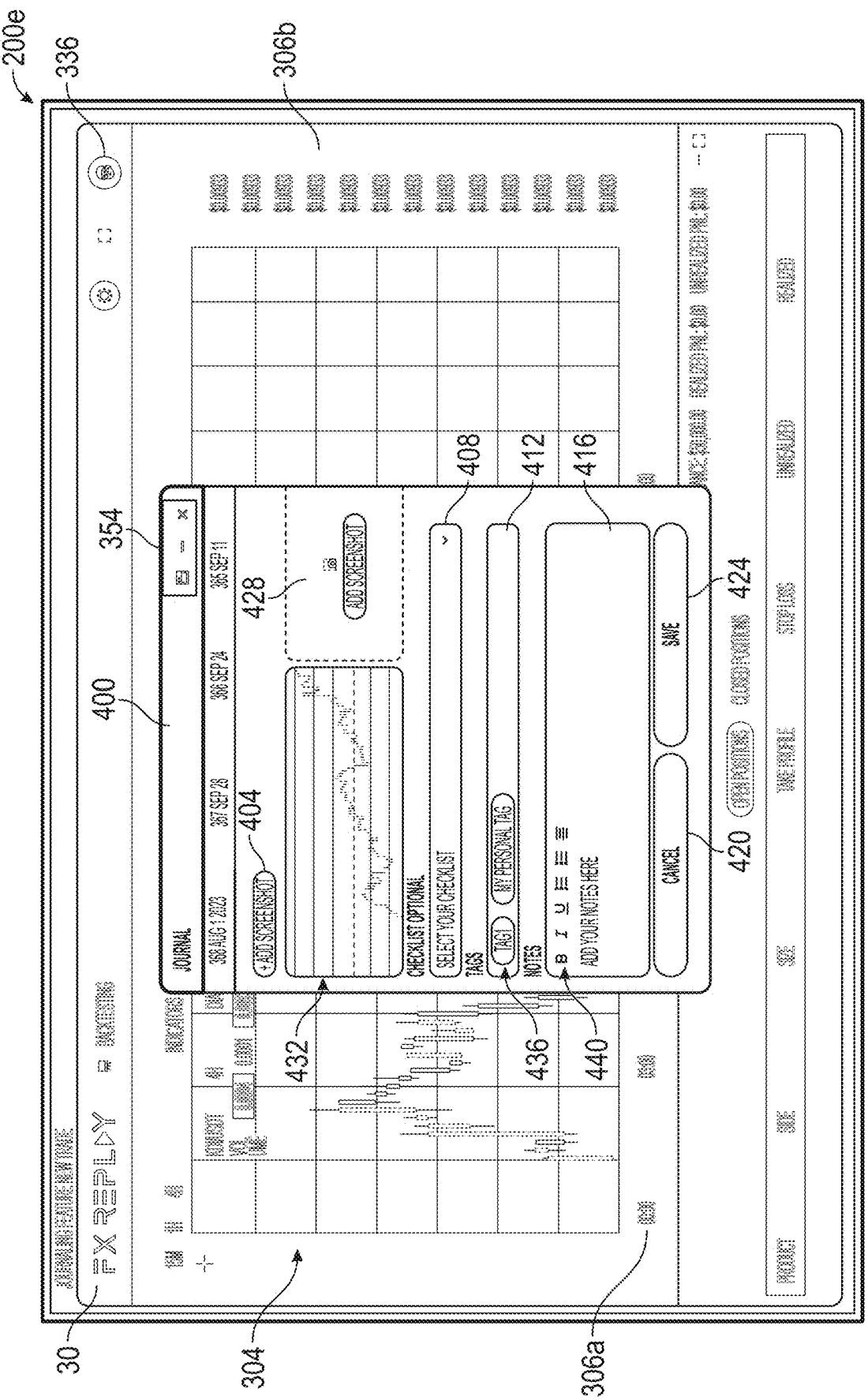
FIG. 5E is a screenshot of an exemplary embodiment of the user device displaying the primary user interface with a journal creation dialog displayed in accordance with the present disclosure.

In one embodiment, the backtesting session view 300 includes the show journal input 320 operable to, upon selection by the user via the user device 18, cause the processing component 58 to receive a journal creation dialog 400 from the processing component 86 executing the backtesting application 90 and may display the journal creation dialog 400 on the primary user interface 30 (as shown in FIG. 5E). In this embodiment, the journal command dialog 350 is not displayed on the primary user interface 30.

In one embodiment, the backtesting session view 300 may further include a session balance 326 showing an account balance for the backtesting session, a realized profit and loss for the backtesting session, and an unrealized profit and loss for the backtesting session.

In one embodiment, the backtesting session view 300 may further include a display setting selector 328 operable to, when selected by the user via the primary user interface 30, cause the processing component 58 to modify a display size of the graph 304.

In one embodiment, the backtesting session view 300 may further include a position table 332 operable to display, on the primary user interface 30, one or more position the user has taken in the backtesting session. In one embodiment, the user may filter the position table 332 based on whether the position is open or closed. It should be understood that the position table 332 may also show orders the user has made in the backtesting session.

In one embodiment, the backtesting session view 300 may further include a user account menu 336 operable to display, on the primary user interface 30, an icon associated with a logged-in user account for the user 14.

Referring now to FIG. 5D, shown therein is a screenshot 200d of an exemplary embodiment of the user device 18 displaying the primary user interface 30 with the journal command dialog 350 displayed in accordance with the present disclosure. Generally, the journal command dialog 350 comprises a dialog controls 354, a new trade option 358 and a past trade option 362. The dialog controls 354 may be operable to cause the processing component 58 to, upon selection or interaction of the user, close the journal command dialog 350, minimize the journal command dialog 350 (e.g., cause the journal command dialog 350 to be substantially hidden from the primary user interface 30), and maximize the journal command dialog 350 (e.g., cause the journal command dialog 350 to substantially fill the primary user interface 30). In one embodiment, the user may create a journal entry via the journal command dialog 350 without placing a trade (e.g., without placing a position or an order)

In one embodiment, upon selection of the new trade option 358, the processing component 58 may receive a journal creation dialog 400 from the processing component 86 executing the backtesting application 90 and may display the journal creation dialog 400 on the primary user interface 30 (as shown in FIG. 5E).

Figure 5F:
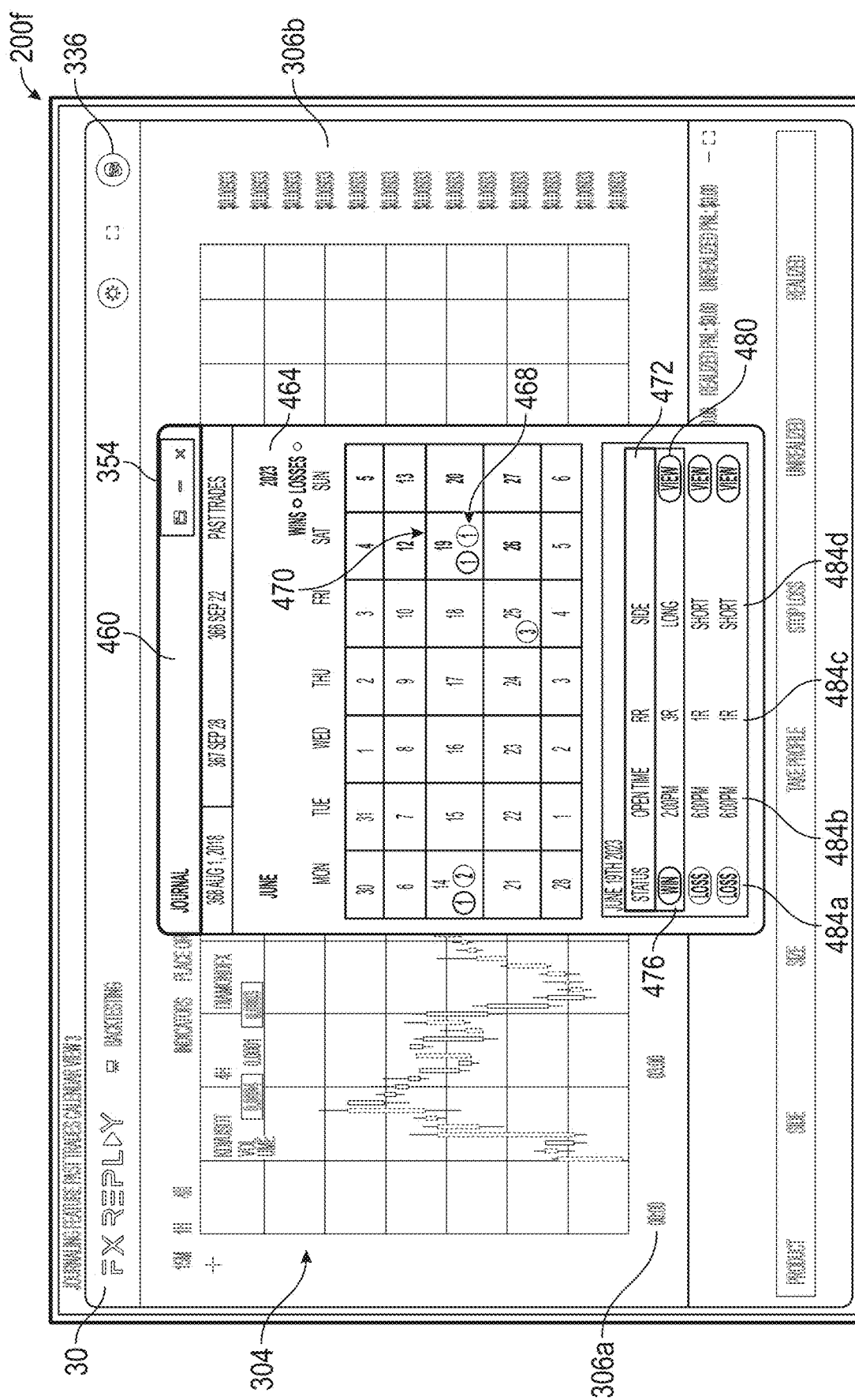
FIG. 5F is a screenshot of an exemplary embodiment of the user device displaying the primary user interface with a past trade dialog displayed in accordance with the present disclosure.

In one embodiment, upon selection of the past trade option 362, the processing component 58 may receive a past trade dialog 460 from the processing component 86 executing the backtesting application 90 and may display the past trade dialog 460 on the primary user interface 30 (as shown in FIG. 5F).

Referring now to FIG. 5E, shown therein is a screenshot 200e of an exemplary embodiment of the user device 18 displaying the primary user interface 30 with the journal creation dialog 400 displayed in accordance with the present disclosure. Generally, journal creation dialog 400 comprises the dialog controls 354, an add screenshot input 404, a checklist selector 408, a tag input 412, a notes input 416, a cancel input 420, and a save input 424. In one embodiment, when the journal creation dialog 400 loads, the processing component 58 may create a new journal model having one or more journal property.

In one embodiment, the user, interacting with the user device 18, may select the add screenshot input 404. The processing component 58 may identify that the add screenshot input 404 has been selected and include one or more new screenshot buttons 428 and may add a screenshot property to the new journal model as one of the journal properties. When the user selects the new screenshot button 428, the processing component 58 may hide the journal creation dialog 400, take a journal screenshot of the graph 304, display the journal creation dialog 400, and change the selected new screenshot button 428 into a thumbnail image of the journal screenshot. The processing component 58 may add the journal screenshot to the new journal model as a value of the screenshot property. In one embodiment, the user may select a second one of the new screenshot button 428 and to include a second journal screenshot, which the processing component 58 may to the new journal model as a second value of the screenshot property.

In one embodiment, the user, interacting with the user device 18, may select the checklist selector 408 to show a list of the one or more checklists 240 (FIG. 5A). When the user selects a particular checklist 240 of the one or more checklists 240, the processing component 58 display the particular checklist below the checklist selector 408. The processing component 58 may add the particular checklist to the new journal model as a value of a checklist property. In one embodiment, the user may select one or more checklist item 258 of the particular checklist and the processing component 58 may update the checklist property of the new journal model based on selection of the one or more checklist item 258.

In one embodiment, the user, interacting with the user device 18, may insert one or more tag 436 in the tag input 412. When the user types a value into the tag input 412, the processing component 58 may communicate with the processing component 86 to determine if the value corresponds to a tag. If the value does correspond with a tag, then the processing component 58 may display the tag 436 in the tag input 412. In one embodiment, if the value does not correspond with a tag, then the processing component 58 may transmit a new tag request to the processing component 86 to cause the processing component 86 to create a new tag corresponding to the value and to store the value in the memory 84, such as in the database 94. The processing component 58 may then as the new tag to the tag input 412 as one of the one or more tags 436. The processing component 58 may add the one or more tags 436 to the new journal model as a value of a taglist property of the journal properties. In one embodiment, the processing component 58 may categorize the new journal entry based on the one or more tags in the taglist property.

In one embodiment, the user, interacting with the user device 18, may insert a note text into the notes input 416. The note text may allow the user 14 to input a present impression about what the current trade is being made. The note text may include reasoning for making the current trade, thoughts about how the current trade aligns with the user's trading strategy, and other information. In one embodiment, the processing component 58 may further cause a template selector to be displayed on the journal creation dialog 400 such that, upon selection by the user, the processing component 58 may display one or more notes text template from which the user may select to be inserted into the notes input 416. In one embodiment, the processing component 58 may add the note text of the notes input 416 to the new journal model as a value of a notes property.

In one embodiment, the notes input 416 further includes one or more formatting controls 440 operable to, upon selection by the user 14, cause the processing component 58 to format text in the notes input 416 with a particular text formatting. Exemplary formatting controls 440 includes a bold control operable to bold selected text, an italics control operable to italicize selected text, an underline control operable to underline selected text, a bullet list control, a numeric list control, and an alignment control operable to change selected text between left justify, right justify, and centered. In some embodiments, additional formatting controls 440 may be included, such as a subscript control, a superscript control, a strikethrough control, a font size control, a font type or style control, an indentation control, a line spacing control, and/or the like. The one or more formatting controls 440 as especially helpful for providing the user a way to visually distinguish and organize the notes text in the notes input 416. In one embodiment, the notes input 416 is operable to receive a markup text (such as a markup language) and generate formatted text based on the markup text.

In one embodiment, the user, interacting with the primary user interface 30 via the user device 18, may select a cancel input 420. When the cancel input 420 is selected by the user, the processing component 58 may discard the new journal model (e.g., delete the new journal model) and close the journal creation dialog 400.

In one embodiment, the user, interacting with the primary user interface 30 via the user device 18, may select the save input 424. When the save input 424 is selected by the user, the processing component 58 may validate, for example, one or more of: the checklist selector 408, the tag input 412 and the notes input 416, e.g., the processing component 58 may determine whether characters input into the notes input 416 are characters that have been allowed in the notes input 416. The processing component 58 may then include a journal timestamp as a journal property in the new journal model and transmit the new journal model from the user device 18 to the backtesting system 22, e.g., via the network 26. The processing component 86 of the backtesting system 22 may receive the new journal model from the user device 18 via the communication device 62. The processing component 86 may then store the new journal model (including the one or more journal properties) into the memory 82, such as in the database 94 and associate the new journal model with the user 14 (such as by associating the new journal model with the user account for the user). The journal timestamp may be a creation time of the new journal model, or may be an execution time of a completed order, e.g., a position. In one embodiment, the processing component 58 may further include historic stock details including, for example, a trade price when the trade is executed and a volume of the trade.

In one embodiment, upon saving the new journal model in the memory 82, the processing component 86 may transmit a response to the processing component 58 indicative of successfully storing the new journal model. The processing component 58 may receive the response and close the journal creation dialog 400. In one embodiment, the processing component 58 may display the response to the user via the primary user interface 30.

Referring now to FIG. 5F, shown therein is a screenshot 200*f* of an exemplary embodiment of the user device 18 displaying the primary user interface 30 with the past trade dialog 460 displayed in accordance with the present disclosure. Generally, the past trade dialog 460 comprises the dialog controls 354, a trade calendar 464 having one or more status icon 468 associated with any day 470 during which the user has made a trade in the backtesting session. In one embodiment, when the user selects a particular day 470, the processing component 58 requests a list of trades the user made for that particular day 470.

As shown in FIG. 5F, the user has selected "Jun. 19, 2023", and the processing component 58, after receiving the list of trades, displays a trades table 472 having one or more trade item 476 corresponding to each trade in the list of trades. Each trade item 476 may include a view button 480 and one or more trade property 484*a-n*. The one or more trade property 484 may include, for example, a status property 484*a*, an open time property 484*b*, a RR property 484*c*, and a side property 484*d*. The status property 484*a* may be indicative of a win or loss, and may be an icon indicative of the win or loss. The open time property 484*b* may be indicative of a time for which a particular trade was opened. The RR property 484*c* may be indicative of a risk-reward ratio, e.g., a ratio used to evaluate the potential risk versus the potential reward of the particular trade. The side property 484*d* may be indicative of whether the trade was a short position or a long position.

In one embodiment, the user, interacting with the primary user interface 30 via the user device 18, may select the view button 480 for a particular trade item 476. When the view button 480 is selected by the user, the processing component 58 may transmit a view journal request to the processing component 86. The processing component 86 may then select a journal model from the memory 82, e.g., from the database 94, corresponding to the journal entry for the selected trade item 476 and return the journal model to the processing component 58, e.g., via the network 26. Upon receiving the journal entry, the processing component 58 may display a view journal dialog 500.

Figure 5G:
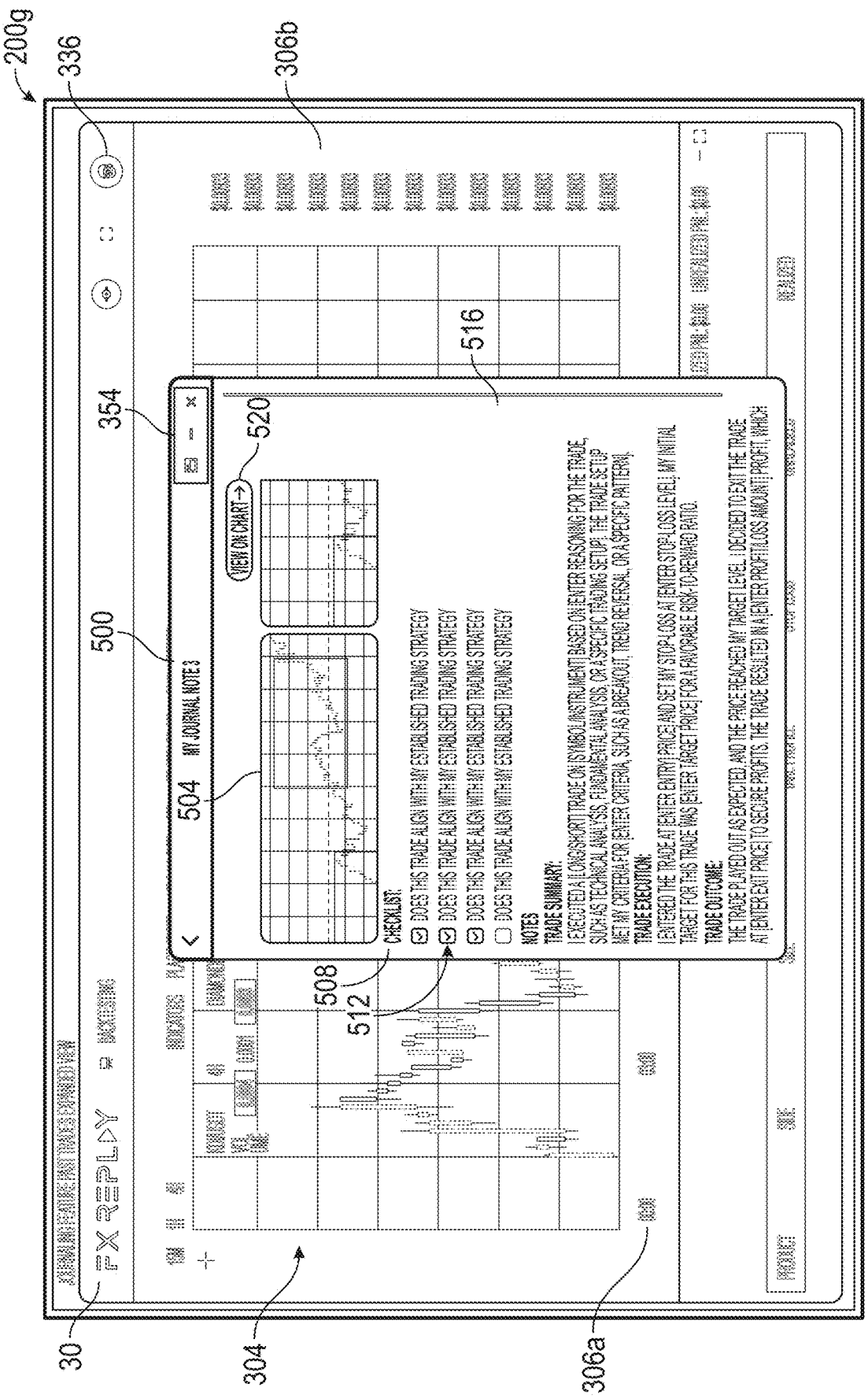
FIG. 5G is a screenshot of an exemplary embodiment of the user device displaying the primary user interface with a view journal dialog displayed in accordance with the present disclosure.

Referring now to FIG. 5G, shown therein is a screenshot 200*g* of an exemplary embodiment of the user device 18 displaying the primary user interface 30 with the view journal dialog 500 displayed in accordance with the present disclosure. Generally, the view journal dialog 500 includes the dialog controls 354 and displays the journal entry (and one or more of the journal properties) for the user to view on the primary user interface 30. For example, the view journal dialog 500 comprises one or more journal screenshot 504 based on the screenshot property of the one or more journal properties of the journal entry, a journal checklist 508 having one or more checklist item 512 based on the checklist property of the one or more journal properties of the journal entry, and a journal notes 516 based on the notes property of the one or more journal properties of the journal entry. In one embodiment, the view journal dialog 500 may further include a chart view button 520.

In one embodiment, the user, interacting with the primary user interface 30 via the user device 18, may select the chart view button 520, thereby causing the processing component 58 to display the journal entry for each selected trade item 476 on the graph 304. When the selected trade item 476 is selected by the user, the processing component 58 may transmit a chart view request to the processing component 86. The processing component 86 may then select each journal model from the memory 82, e.g., from the database 94, corresponding to the backtesting session on the day 470 corresponding to the journal entry of the view journal dialog 500 and return a journal list of the journal models to the processing component 58, e.g., via the network 26. Upon receiving the journal list, the processing component 58 may display a journal chart view 550.

Figure 5H:
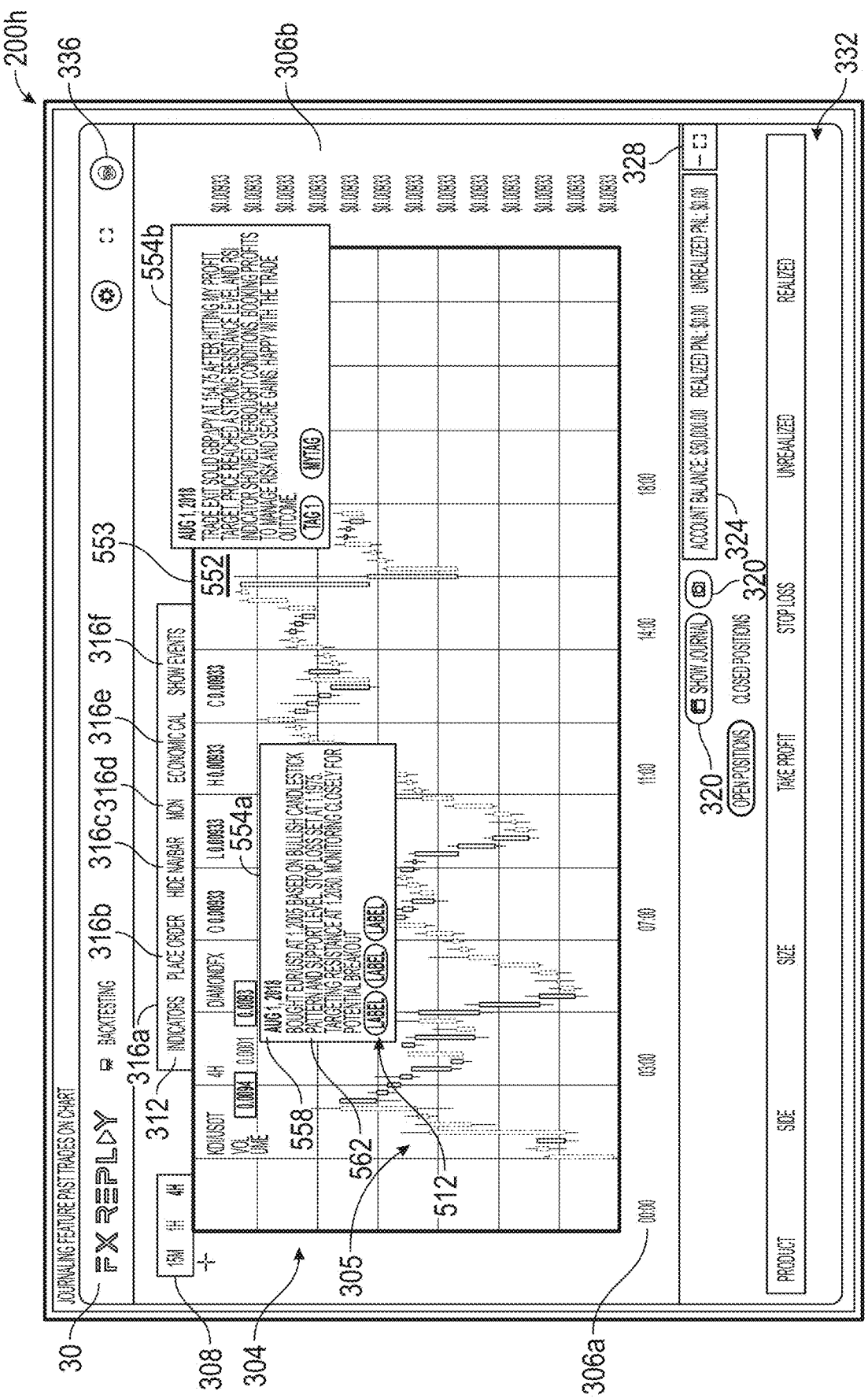
FIG. 5H is a screenshot of an exemplary embodiment of the user device displaying the primary user interface with a journal chart view displayed in accordance with the present disclosure.

Referring now to FIG. 5H, shown therein is a screenshot 200*h* of an exemplary embodiment of the user device 18 displaying the primary user interface 30 with the journal chart view 550 displayed in accordance with the present disclosure. Generally, the journal chart view 550 is constructed in accordance with the backtesting session view 300 (FIG. 5C) with the exception that the journal chart view 550 further includes one or more journal preview bubble 554 (shown in FIG. 5H as a first journal preview bubble 554*a* and a second journal preview bubble 554*b*). In one embodiment, the journal chart view 550 includes a journal preview bubble 554 for each of the journal models in the journal list. In one embodiment, each journal preview bubble 554 may be considered a journal indicator 552. In other embodiments, the journal indicator 552 may be an icon drawn on the journal chart view 550 (e.g., the backtesting session view 300 having one or more journal indicator drawn thereon). Each journal indicator 552 may be drawn on the journal chart view 550 at a position on the axis of abscissas 306*a* corresponding to the journal timestamp. Drawing each journal indicator 552 on the backtesting session view 300 at a position on the axis of abscissas 306*a* corresponding to the journal timestamp provides a specific improvement over prior systems, resulting in an improved primary user interface 30 for the user device 18.

In one embodiment, the processing component 86 may determine a stock value of the historic stock 305, a bounding box 553 of the journal indicator 552, and may draw the journal indicator 552 on the graph 304 at a first position on the axis of abscissas 306a near to the journal timestamp and a second position on the axis or ordinates 306b near to the trade price without the bounding box 553 of the journal indicator 552 overlapping the graph 304. Drawing each journal indicator 552 such that the bounding box 553 of the journal indicator 552 does not overlap the graph 304 provides an improvement over prior systems by improving the ability of the primary user interface 30 to display information to the user (e.g., the journal indicator 552) without obscuring other information (e.g., the graph 304).

As shown, each journal preview bubble 554 displays the value of one or more journal property of the journal model. For example, the first journal preview bubble 554a includes a trade timestamp 558 (while shown as a date in FIG. 5H, the trade timestamp 558 may further include a time), at least a note portion 562 of the notes property of the one or more journal properties of the journal entry, and one or more tags from the taglist property of the one or more journal properties of the journal entry. In one embodiment, each journal preview bubble 554 may be drawn on the journal chart view 550 (e.g., the backtesting session view 300 having one or more journal preview bubble 554 drawn thereon). Each journal preview bubble 554 may be drawn on the journal chart view 550 at a position on the axis of abscissas 306a corresponding to the journal timestamp, or the trade timestamp 558. Drawing each journal preview bubble 554 on the backtesting session view 300 at a position on the axis of abscissas 306a corresponding to the journal timestamp provides a specific improvement over prior systems, resulting in an improved primary user interface 30 for the user device 18.

By precisely placing the journal indicators at positions corresponding to the journal timestamps on the axis of abscissas 306a, while ensuring the journal indicators do not obscure price data, the system 10 enables users to see trade decisions and notes in direct visual correlation with price movements. This integration of journal entries alongside price data allows for immediate contextual analysis of trading decisions. Users can instantly visualize how their recorded thoughts, strategies, and actions align with market movements, without losing visibility of the underlying price action. This enhanced visual correlation significantly improves the usability and effectiveness of the primary user interface 30, enabling users to more efficiently analyze their trading performance, identify patterns in their decision-making, and refine their strategies. The system's ability to display this crucial information simultaneously and non-intrusively represents a marked improvement over traditional backtesting systems where such correlations are difficult or impossible to visualize directly. In this way, the system 10 may enhance the user's ability to gain insights from their historical trading data and improve future trading outcomes by improving positioning of the journal indicators on the primary user interface 30.

In one embodiment, the note portion 562 may include the whole of the notes property, however, in other embodiments, the note portion 562 may include a predetermined number of characters or words of the notes property.

Figure 5I:
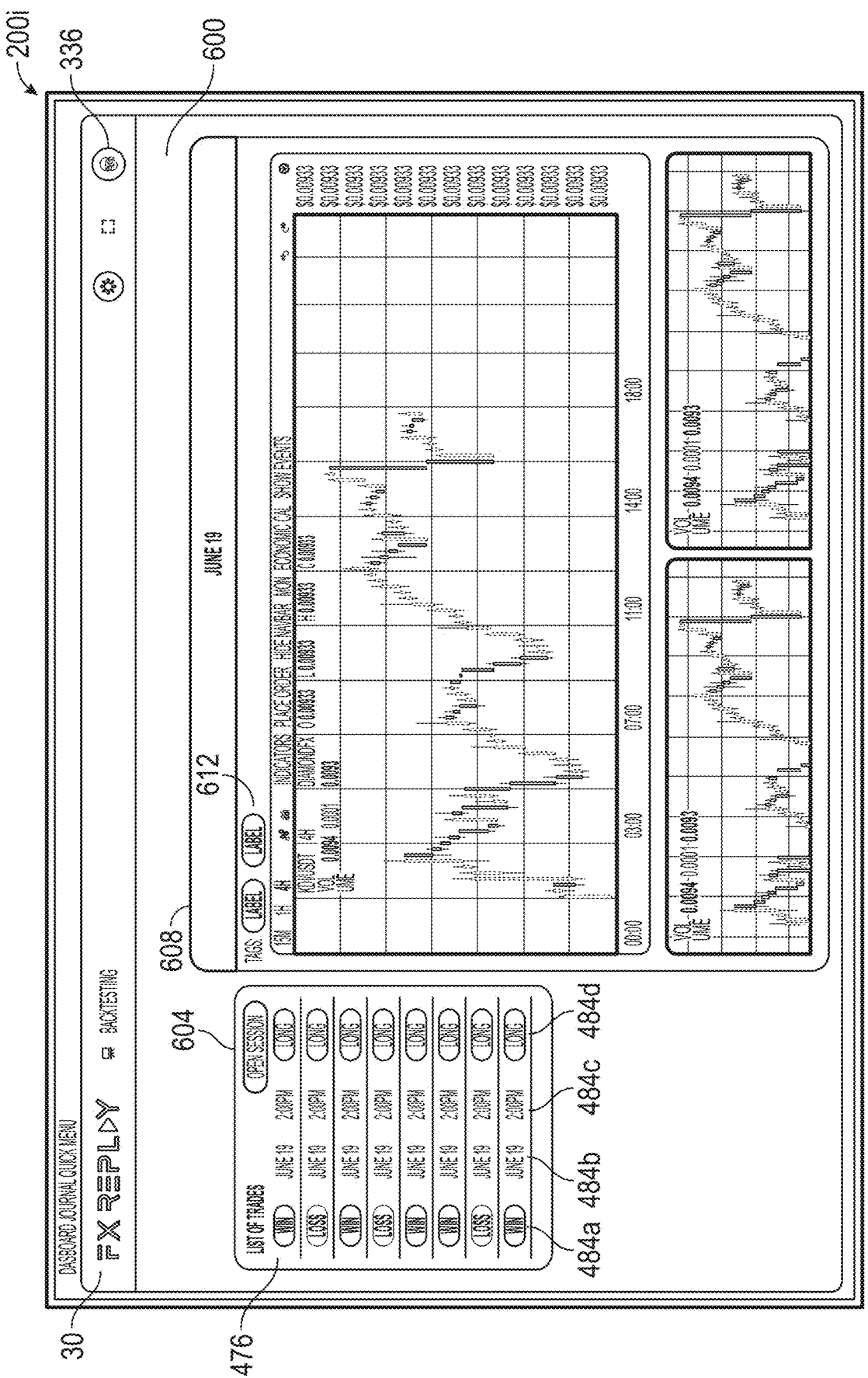
FIG. 5I is a screenshot of an exemplary embodiment of the user device displaying the primary user interface with a journal list view displayed in accordance with the present disclosure.

Referring now to FIG. 5I, shown therein is a screenshot 200i of an exemplary embodiment of the user device 18 displaying the primary user interface 30 with a journal list view 600 displayed in accordance with the present disclosure. Generally, the journal list view 600 comprises a journal table 604 and a journal display 608. The journal table 604 may display one or more trade item 476 having the one or more trade property 484a-n.

In one embodiment, when the journal list view 600 is loaded into the primary user interface 30, the processing component 58 may transmit a journal list request having one or more (optional) filter criteria to the processing component 86. The processing component 86 may then select one or more journal model from the memory 82, e.g., from the database 94, based on the one or more filter criteria. The processing component 86 may then return a journal list of the journal models to the processing component 58, e.g., via the network 26. Upon receiving the journal list, the processing component 58 generates the one or more trade item 476 based on journal models in the journal list.

In one embodiment, the one or more filter criteria include a tag and condition, wherein the processing component 86 may select journal models from the memory 82 where if the condition between the tag and the taglist property is met. For example, the condition may be "includes", thereby causing the processing component 86 to select journal models from the memory 82 where the taglist property of the journal model includes the tag. Conversely, if the condition is "excludes", the processing component 86 may select journal models from the memory 82 where the taglist property of the journal model excludes (i.e., does not include) the tag. In one embodiment, the one or more filter criteria further includes a checklist, a checklist item, and a trade result (such as a win, a loss, or a risk-return ratio). The one or more filter criteria may be based any of the one or more journal properties.

In one embodiment, when a particular trade item 476 in the journal table 604 is selected by the user, the processing component 58 may transmit the view journal request to the processing component 86. The processing component 86 may then select a journal model from the memory 82, e.g., from the database 94, corresponding to the journal entry for the selected trade item 476 and return the journal model to the processing component 58, e.g., via the network 26. Upon receiving the journal entry, the processing component 58 may display one or more of the journal properties of the journal model in the journal display 608. In one embodiment, the journal display 608 is constructed in accordance with the view journal dialog 500 with the exception that the journal display 608 is not a dialog, e.g., does not include the dialog controls 354 and is shown in an enlarged position in the primary user interface 30. In one embodiment, the journal display 608 may further include a tag list 612 operable to display each tag of the taglist property of the journal model.

In one embodiment, the user may interact with the primary user interface 30 thereby causing the processing component 58 to send a share request to the processing component 86 thereby causing the processing component 86 to generate the sharable code. The processing component 86 may store the sharable code in the memory 82 such as in the database 94 and associate the sharable code with the journal entry. In one embodiment the shareable code may be a unique code. In another embodiment, the shareable code may be a link to add the other user to an access control list (ACL) of the journal entry. In another embodiment, access to the journal entry may be controlled by an ACL, in which case, upon receiving the share request, the processing component 86 may update the ACL to provide access to the journal entry to one or more user or user group.

In one embodiment, the share request may further cause the processing component 86 to transmit the sharable code to a third-party. The processing component 86 may transmit the sharable code to the third-party via the network 26, for example, via an email message, a text message, an MMS message, an instant message, a chat message, an RCS message, an iMessage, and/or the like. In one embodiment, a third-party, having the sharable code, may access the backtesting system 22 to view the journal entry. In some embodiments, the third-party may further provide one or more feedback, such as a comment, to the journal entry. The processing component 86 may provide a notification to the user 14, such as via the user device 18, that the journal entry has received feedback.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A system, comprising:
   a processing component comprising one or more processor; and
   a memory comprising a non-transitory processor-readable medium storing processor-executable instructions that when executed by the processing component, causes the processing component to:
      generate a backtesting session view for a backtesting session comprising a historic stock mapped on a graph, the graph having an axis of abscissas corresponding to a time and an axis of ordinates corresponding to a value of the historic stock;
      receive a first input indicative of a user selecting a new trade option;
      generate a journal creation dialog having one or more inputs selected from: an add screenshot input, a checklist selector, a tag input, and a notes input;
      receive a journal model having one or more journal property based on the one or more input of the journal creation dialog and a journal timestamp;
      associate the journal model with the backtesting session;
      store the journal model in the memory;
      determine a stock value of historic stock and bounding box of one or more journal indicator; and
      draw and display, in the backtesting session view, the one or more journal indicator corresponding to the journal model on the graph of the historic stock, placing the one or more journal indicator at a first position on the axis of abscissas corresponding to the journal timestamp and at a second position on the axis of ordinates associated with the stock value of the historic stock, the one or more journal indicator being bounded by a bounding box, wherein the first position and the second position are selected such that the one or more journal indicator do not overlap the historic stock mapped on the graph, enabling the user to see trade decisions and notes in direct visual correlation with price movements; and
      wherein the one or more journal indicator displays values of the one or more journal property of the journal model, the one or more journal property comprising at least one of: the journal timestamp, at least a portion of the notes, and one or more tag.

2. The system of claim 1, wherein the notes input further comprises one or more formatting controls operable to apply one or more formatting to notes text entered into the notes input.

3. The system of claim 1, wherein the memory further stores instructions that cause the processing component to:
   receive a template input indicative of whether to include the journal model as a template; and
   store the journal model as the template in the memory.

4. The system of claim 3, wherein the one or more inputs further includes a template selector operable to receive a selection of the template.

5. The system of claim 1, wherein the memory further stores instructions that cause the processing component to:
   receive a selection of a particular journal indicator; and
   responsive to the selection, expand the particular journal indicator to display a journal preview bubble showing one or more journal properties of the corresponding journal model.

6. The system of claim 1, wherein the memory further stores a journal list and instructions which cause the processing component to:
   retrieve the journal list comprising one or more journal model from the memory, each journal model comprising the one or more journal property; and
   update the backtesting session view to include the one or more journal indicator on the graph of the historic stock for each of the one or more journal model in the journal list.

7. The system of claim 1, wherein the memory further stores instructions that cause the processing component to:
   generate a past trade dialog comprising a trade calendar having one or more status icon associated with any day during which the user has made a trade in the backtesting session;
   receive a selection of a particular day;
   display a trades table having one or more trade item corresponding to each trade in a list of trades for the particular day, each trade item including a view button and one or more trade property; and
   responsive to receiving a selection of the view button for a particular trade item, display a view journal dialog showing a journal entry corresponding to the journal model for the particular trade item.

8. The system of claim 1, wherein the memory further stores instructions that cause the processing component to:
   transmit a journal list request having one or more filter criteria to the processing component;
   select one or more journal model from the memory based on the one or more filter criteria as a journal list;
   generate a journal list view comprising a journal table displaying one or more trade item having one or more trade property based on journal models in the journal list; and
   responsive to receiving a selection of a particular trade item in the journal table, display a journal display showing one or more of the journal properties of the journal model corresponding to the particular trade item.

9. The system of claim 8, wherein the one or more journal property of each journal model includes a taglist property; and the one or more filter criteria include a tag and a condition, wherein the processing component selects journal models from the memory where the condition between the tag and the taglist property is met.

10. The system of claim 1, wherein the memory further stores instructions that cause the processing component to:

receive a share request associated with a journal entry of the journal model;

generate a sharable code associated with the journal entry, the sharable code associated with one or more access control list (ACL) to provide access to the journal entry to a third-party;

store the sharable code in the memory in association with the journal entry and the one or more ACL; and transmit the sharable code to the third-party, wherein the sharable code allows the third-party to access the journal entry.

11. A method comprising:

generating, by a processing component comprising one or more processor, a backtesting session view for a backtesting session comprising a historic stock mapped on a graph, the graph having an axis of abscissas corresponding to a time and an axis of ordinates corresponding to a value of the historic stock;

receiving a first input indicative of a user selecting a new trade option;

generating a journal creation dialog having one or more inputs selected from: an add screenshot input, a checklist selector, a tag input, and a notes input;

receiving a journal model having one or more journal property based on the one or more input of the journal creation dialog and a journal timestamp;

associating the journal model with the backtesting session;

storing the journal model in a memory;

determine a stock value of historic stock and bounding box of one or more journal indicator; and drawing and displaying, in the backtesting session view, the one or more journal indicator corresponding to the journal model on the graph of the historic stock, placing the one or more journal indicator at a first position on the axis of abscissas corresponding to the journal timestamp and at a second position on the axis of ordinates associated with the value of the historic stock, the one or more journal indicator being bounded by a bounding box, wherein the first position and the second position are selected such that the one or more journal indicator do not overlap the historic stock mapped on the graph, enabling the user to see trade decisions and notes in direct visual correlation with price movements; and wherein the one or more journal indicator displays values of the one or more journal property of the journal model, the one or more journal property comprising at least one of: the journal timestamp, at least a portion of the notes, and one or more tag.

12. The method of claim 11, wherein the notes input further comprises one or more formatting controls operable to apply one or more formatting to notes text entered into the notes input.

13. The method of claim 11, further comprising:

receiving a template input indicative of whether to include the journal model as a template; and storing the journal model as the template in the memory.

14. The method of claim 11, wherein the one or more journal indicator is a journal preview bubble showing one or more journal property of the journal model.

15. The method of claim 11, further comprising:

retrieving a journal list comprising one or more journal model from the memory, each journal model comprising the one or more journal property; and updating the backtesting session view to include the one or more journal indicator on the graph of the historic stock for each of the one or more journal model in the journal list.

16. The method of claim 11, further comprising:

generating a past trade dialog comprising a trade calendar having one or more status icon associated with any day during which the user has made a trade in the backtesting session;

receiving a selection of a particular day;

displaying a trades table having one or more trade item corresponding to each trade in a list of trades for the particular day, each trade item including a view button and one or more trade property; and responsive to receiving a selection of the view button for a particular trade item, displaying a view journal dialog showing a journal entry corresponding to the journal model for the particular trade item.

17. The method of claim 11, further comprising:

transmitting a journal list request having one or more filter criteria to the processing component;

selecting one or more journal model from the memory based on the one or more filter criteria as a journal list;

generating a journal list view comprising a journal table displaying one or more trade item having one or more trade property based on journal models in the journal list; and responsive to receiving a selection of a particular trade item in the journal table, displaying a journal display showing one or more of the journal properties of the journal model corresponding to the particular trade item.

18. The method of claim 17, wherein:

the one or more journal property of each journal model includes a taglist property; and the one or more filter criteria include a tag and a condition, wherein selecting one or more journal model from the memory comprises selecting journal models where the condition between the tag and the taglist property is met.

19. The method of claim 11, further comprising:

receiving a share request associated with a journal entry;

generating a sharable code associated with the journal entry, the sharable code associated with one or more access control list (ACL) to provide access to the journal entry to a third-party;

storing the sharable code in the memory in association with the journal entry and the one or more ACL; and transmitting the sharable code to the third-party, wherein the sharable code allows the third-party to access the journal entry.

* * * * *